United States Patent
Mizukami

(10) Patent No.: US 7,792,545 B2
(45) Date of Patent: Sep. 7, 2010

(54) RADIO COMMUNICATION TERMINAL AND METHOD OF CONTROLLING INTERNAL RADIO COMMUNICATION

(75) Inventor: Hiromitsu Mizukami, Suwa (JP)

(73) Assignee: Seiko Epson Corporation (JP)

( * ) Notice: Subject to any disclaimer, the term of this patent is extended or adjusted under 35 U.S.C. 154(b) by 178 days.

(21) Appl. No.: 12/172,450

(22) Filed: Jul. 14, 2008

(65) Prior Publication Data

US 2009/0181618 A1 Jul. 16, 2009

Related U.S. Application Data

(62) Division of application No. 11/170,621, filed on Jun. 29, 2005, now Pat. No. 7,412,256.

(30) Foreign Application Priority Data

Jul. 1, 2004 (JP) ............... 2004-195541

(51) Int. Cl.
*H04M 1/00* (2006.01)
(52) U.S. Cl. ................ 455/553.1; 455/63.1; 455/67.13; 455/552.1
(58) Field of Classification Search ............. 455/67.11, 455/67.13, 550.1, 575.1, 575.3; 379/428.01, 379/433.01, 433.11, 433.13
See application file for complete search history.

(56) References Cited

U.S. PATENT DOCUMENTS

| 6,519,020 | B1 | 2/2003 | Cha et al. |
| 7,212,845 | B2 | 5/2007 | Ikeuchi |
| 7,251,323 | B2 | 7/2007 | Holtorf et al. |
| 2005/0020299 | A1 | 1/2005 | Malone et al. |

FOREIGN PATENT DOCUMENTS

| JP | 11-308173 | 11/1999 |
| JP | 3086456 | 7/2000 |
| JP | 2002-217800 | 8/2002 |
| JP | 2003-507954 | 2/2003 |
| JP | 2003-143272 | 5/2003 |
| JP | 2004-172826 | 6/2004 |
| WO | WO 01/15329 A1 | 3/2001 |

OTHER PUBLICATIONS

Communication from Japanese Patent Office regarding related application.

*Primary Examiner*—Raymond S Dean
(74) *Attorney, Agent, or Firm*—Harness, Dickey & Pierce, P.L.C.

(57) ABSTRACT

A carrier sensor senses the input/output level of a radio processing unit. When the input/output level sensed by the carrier sensor is more than a specified level, a transmission-reception controller stops internal radio communication by stopping the operation of transmission/reception units. When the input/output level sensed by the carrier sensor is less than a specified level, the transmission-reception controller allows internal radio communication by operating the transmission/reception units.

10 Claims, 14 Drawing Sheets

PACKET

INTERNAL COMMUNICATION CONTROL WHEN TERMINAL IS MASTER

INTERNAL COMMUNICATION CONTROL WHEN TERMINAL IS SLAVE AND RECEIVES PACKET ADDRESSED TO IT

INTERNAL COMMUNICATION CONTROL WHEN TERMINAL IS SLAVE AND PACKET IS NOT ADDRESSED TO IT

RADIO COMMUNICATION TERMINAL AND METHOD OF CONTROLLING INTERNAL RADIO COMMUNICATION

CROSS-REFERENCE TO RELATED APPLICATIONS

This application is a divisional patent application of U.S. Ser. No. 11/170,621 filed Jun. 29, 2005, claiming priority to Japanese Patent Application No. 2004-195541 filed Jul. 1, 2004, all of which are incorporated by reference.

BACKGROUND

1. Technical Field

The present invention relates to a radio communication terminal and a method of controlling internal radio communication, and in particular, it relates to a control method applicable to a clamshell cellular telephone.

2. Background Art

Liquid crystal displays mounted in recent cellular telephones are provided with higher resolution to display still images such as characters and graphics and also still images and moving images picked up by digital cameras at higher definition. With this, the amount of data exchanged between digital cameras and liquid crystal displays is increasing, and it is proposed in Japanese Patent No. 3,086,456 that a high-speed transfer mode called low voltage differential signaling (LVDS) be used to connect displays and image photographing devices.

Also, recent cellular telephones adopt a clamshell structure in which the cellular telephones can be folded to increase the size of the displays without losing portability and prevent unintended pushing of operation buttons when they are being carried. In the clamshell structure, a first casing housing a control panel that principally controls the external radio communication of a cellular telephone and a second casing housing a display are connected together with a hinge, and the first casing and the second casing can be closed and opened via the hinge.

Also, in order to allow a weak GPS signal to be received even while transmitting from a moving platform, JP-T-2003-507954 for example discloses a method in which a branch unit is provided upstream from the antenna for branching part of the transmitted signal, an interference compensating signal is taken out by attenuating and phase-shifting the signal branched by the branch unit, and the interference compensation signal is superimposed on the GPS signal.

However, as the display mounted on a cellular telephone comes to have higher resolution, to transmit high-bit-rate image data by wire, it is necessary to provide the flexible wiring board for transmitting the signal to the display with a multipin structure. Accordingly, when data transmission between the first casing and the second casing is performed by wire in a cellular telephone with the clamshell structure, it is necessary to pass the multipin flexible wiring board through the hinge, complicating the hinge structure and the mounting process. As a result, this presents an obstacle to more compact and thinner cellular telephones, increases cost, and decreases reliability.

On the other hand, when an internal radio communication antenna is provided to both the first casing and the second casing in place of the flexible wiring board, in which data transmission between the first casing and the second casing is performed by internal radio communication, interference is generated between it and the external radio communication of the cellular telephone. This poses the problem of changing the environment of the internal radio communication depending on the status of the external radio communication, so that the reliability of data transmission is not decreased.

Particularly, when a radio communication system in which output is limited to a low level, such as an ultra wide band (UWB) system, is adopted for the internal radio communication, the difference in power level between it and a radio wave outputted in the external radio communication of the cellular telephone is large, such as 90 dB. This also presents the problem that the influence of signals outside the specific frequency band of the internal radio communication cannot be ignored, there being deterioration of the radio communication environment due to the interference of the external radio communication of the cellular telephone which increases the bit error rate and packet error rate leading to an increase in the need for retransmissions.

Also, even when a radio communication system in which only weak power is radiated is adopted, those radio waves interfere with the cellular telephone system because the latter requires high reception sensitivity, posing the problem that the reception sensitivity of the cellular telephone system is decreased.

Also, the method disclosed in JP-T-2003-507954 requires a branch unit, an attenuator, a phase shifter, and a superimposer. This produces the problem of complicating the circuit structure and increasing the size, resulting in an increase in cost, size, and weight.

Accordingly, it is an object of the present invention to provide a radio communication terminal and a method of controlling internal radio communication capable of preventing the deterioration in the quality of internal radio communication between the first casing and the second casing, by allowing for a change in the state of external radio communication.

SUMMARY

In order to solve the above-described problems, according to an embodiment of the present invention, there is provided a radio communication terminal including a first casing, a second casing, and a connecting part that connects the first casing and the second casing together so that the relative position of the first casing and the second casing can be varied. The radio communication terminal is characterized in that the second casing includes a display, a second internal radio communication antenna, and a second transmission/reception unit that transmits or receives data to/from the first casing via the second internal radio communication antenna; the first casing includes an external radio processing unit that transmits or receives data to/from the outside, a first internal radio communication antenna, a first transmission/reception unit that transmits or receives data to/from the second casing via the first internal radio communication antenna, and an internal transmission-reception controller that is connected by wire with the first transmission/reception unit or the second transmission/reception unit or both; and the internal transmission-reception controller controls the timing of transmitting a radio wave sent from the first transmission/reception unit or the second transmission/reception unit or both, according to the timing by which the external radio processing unit transmits or receives data to/from the outside.

This allows radio data transmission between the first casing and the second casing during the time when no radio wave is being sent to/from the external radio communication antenna. This can prevent degradation in the quality of internal radio communication between the first casing and the second casing, by allowing for a change in the state of external radio communication, and can change the positional relationship between the first casing and the second casing without complicating the structure of the connecting part even when the amount of data transmitted between the first casing and the second casing increases. Consequently, a smaller and thinner radio communication terminal with higher reliability can be achieved without an increase in cost, and a radio communication terminal with a larger screen and a greater number of functions can be achieved without losing portability.

According to an embodiment of the invention, there is provided a radio communication terminal including a first casing, a second casing, and a connecting part that connects the first casing and the second casing together so that the relative position of the first casing and the second casing can be varied. The radio communication terminal is characterized in that: the second casing includes a display, a second internal radio communication antenna, and a second transmission/reception unit that transmits or receives data to/from the first casing via the second internal radio communication antenna; the first casing includes an external radio processing unit that transmits or receives data to/from the outside, a first internal radio communication antenna, a first transmission/reception unit that transmits or receives data to/from the second casing via the first internal radio communication antenna, and an internal transmission-reception controller that is connected by wire with the first transmission/reception unit or the second transmission/reception unit or both; and the internal transmission-reception controller stops the operation of the first transmission/reception unit or the second transmission/reception unit or both according to the timing at which the external radio processing unit transmits or receives data to/from the outside.

By receiving transmission timing information from the external radio communication controller, it becomes possible to determine whether radio waves are being sent to/from the external radio communication antenna. This allows internal radio communication between the first casing and the second casing to be made during the time when no external radio communication is performed while preventing complication and an increase in the size of the circuit structure. Consequently, a smaller and thinner radio communication terminal with higher reliability can be achieved without an increase in cost and a radio communication terminal with a larger screen and a greater number of functions can be achieved without losing portability.

According to an embodiment of the present invention, there is provided a radio communication terminal including a first casing, a second casing, and a connecting part that connects the first casing and the second casing together so that the relative position of the first casing and the second casing can be varied. The radio communication terminal is characterized in that: the second casing includes a display, a second internal radio communication antenna, and a second transmission/reception unit that transmits or receives data to/from the first casing via the second internal radio communication antenna; the first casing includes an external radio processing unit that transmits or receives data to/from the outside, a first internal radio communication antenna, a first transmission/reception unit that transmits or receives data to/from the second casing via the first internal radio communication antenna, and an internal transmission-reception controller that is connected by wire with the first transmission/reception unit or the second transmission/reception unit or both, the internal transmission-reception controller stopping the operation of the first transmission/reception unit or the second transmission/reception unit or both based on a time schedule determined according to the transmission/reception timing of the external radio processing unit.

This allows internal radio communication when the external radio communication is idle, preventing degradation in the quality of internal radio communication between the first casing and the second casing and also preventing a decrease in the efficiency of the internal radio communication.

A radio communication terminal according to an embodiment of the invention is characterized in that the internal transmission-reception controller stops the operation of the first transmission/reception unit or the second transmission/reception unit or both until the following transmission slot when its own terminal is the master and it sends a packet to the slave or when its own terminal is the slave, it receives a packet addressed to it, and it sends a packet back to the master.

This allows a determination of the timing of external radio communication by referring to the packet header received this time even when a communication between the master and the slave in Piconet is established. This allows internal radio communication during the external radio communication idle time, preventing degradation in the quality of internal radio communication while preventing complication and an increase in the size of the circuit structure.

According to an embodiment of the present invention, there is provided a radio communication terminal including a first casing, a second casing, and a connecting part that connects the first casing and the second casing together so that the relative position of the first casing and the second casing can be varied. The radio communication terminal is characterized in that: the second casing includes a display, a second internal radio communication antenna, and a second transmission/reception unit that transmits or receives data to/from the first casing via the second internal radio communication antenna; the first casing includes an external radio processing unit that transmits or receives data to/from the exterior, a first internal radio communication antenna, a first transmission/reception unit that transmits or receives data to/from the second casing via the first internal radio communication antenna, an internal transmission-reception controller that is connected by wire with the first transmission/reception unit or the second transmission/reception unit or both, and a carrier sensor that senses the output level of the external radio processing unit; and the internal transmission-reception controller stops the operation of the first transmission/reception unit or the second transmission/reception unit or both according to the output level sensed by the carrier sensor.

This allows a determination as to whether a radio wave is being sent via the external radio communication antenna by monitoring the output level of the radio processing unit. This allows internal radio communication between the first casing and the second casing while no external radio communication is being done, thus preventing complication and an increase in the size of the circuit structure. Consequently, a smaller and thinner radio communication terminal with higher reliability can be achieved without an increase in cost, and a radio communication terminal with a larger screen and a greater number of functions can be achieved without losing portability.

Further, according to an embodiment of the present invention, there is provided a radio communication terminal including a first casing, a second casing, and a connecting part that connects the first casing and the second casing together so that the relative position of the first casing and the second casing can be varied. The radio communication terminal is characterized in that: the second casing includes a display, a second internal radio communication antenna, and a second transmission/reception unit that transmits or receives data to/from the first casing via the second internal radio communication antenna; the first casing includes an external radio communication antenna, an external radio processing unit that transmits or receives data to/from the exterior, a first internal radio communication antenna, a first transmission/reception unit that transmits or receives data to/from the second casing via the first internal radio communication antenna, an internal transmission-reception controller that is connected by wire with the first transmission/reception unit or the second transmission/reception unit or both, a carrier sensing antenna that receives radio waves sent from the external radio communication antenna, a carrier sensor that senses the output level of the radio wave received by the carrier sensing antenna; the internal transmission-reception controller stopping the operation of the first transmission/reception unit or the second transmission/reception unit or both according to the output level sensed by the carrier sensor.

Accordingly, the output level of a radio wave sent to/from the external radio communication antenna can be directly monitored, allowing a determination as to whether a radio wave is being sent/received via the external radio communication antenna even when it is difficult to determine the timing of external radio communication. This allows internal radio communication between the first casing and the second casing to be made during the time when no external radio communication is performed. Consequently, a smaller and thinner radio communication terminal with higher reliability can be achieved without an increase in cost, and a radio communication terminal with a larger screen and a greater number of functions can be achieved without losing portability.

Further, according to an embodiment of the present invention, there is provided a radio communication terminal including a first casing, a second casing, and a connecting part that connects the first casing and the second casing together so that the relative position of the first casing and the second casing can be varied. The radio communication terminal is characterized in that: the first casing includes an external radio communication antenna, an external radio processing unit that transmits or receives data to/from the exterior, a first internal radio communication antenna, a first transmission/reception unit that transmits or receives data to/from the second casing via the first internal radio communication antenna, a first internal transmission-reception controller that is connected with the first transmission/reception unit by wire, a first carrier sensing antenna that receives radio waves sent from the external radio communication antenna, and a first carrier sensor that senses the output level of the radio wave received by the first carrier sensing antenna; the second casing includes a display, a second internal radio communication antenna, a second transmission/reception unit that transmits or receives data to/from the first casing via the second internal radio communication antenna, a second internal transmission-reception controller that is connected with the second transmission/reception unit by wire, a second carrier sensing antenna that receives a radio wave sent from the external radio communication antenna, and a second carrier sensor that senses the output level of the radio wave received by the second carrier sensing antenna; the first internal transmission-reception controller stopping the operation of the first transmission/reception unit according to the output level sensed by the first carrier sensor; and the second internal transmission-reception controller stopping the operation of the second transmission/reception unit according to the output level sensed by the second carrier sensor.

Accordingly, the output level of a radio wave sent via the external radio communication antenna can be directly monitored on both sides of the first casing and the second casing. Thus the operation of both the first internal transmission-reception controller and the second internal transmission-reception controller can be stopped without connecting the first casing and the second casing by wire while external radio communication is performed, preventing the degradation in the quality of internal radio communication between the first casing and the second casing by allowing for a change in the state of the external radio communication.

A radio communication terminal according to an embodiment of the invention is characterized in being a cellular telephone.

This allows stable radio data transmission between the casings of a cellular telephone with a clamshell structure. Accordingly, even when the amount of data exchanged between the casings increases with an increase in the resolution of the display mounted to a cellular telephone, the complication of the structure of the connecting part and the mounting process can be prevented. Consequently, a smaller and thinner radio communication terminal with higher reliability can be achieved without an increase in cost, and a radio communication terminal with a larger screen and a greater number of functions can be achieved without losing portability.

A radio communication terminal according to an embodiment of the invention is characterized in that the internal radio communication is a short-range radio communication such as a weak radio or an ultra-wideband radio communication.

This allows stable internal radio communication while reducing the output level of internal radio communication. Accordingly, even when the amount of data transmission between the first casing and the second casing increases, the data transmission between the first casing and the second casing can be performed by radio free from legal regulation, and allowing the positional relationship between the first casing and the second casing to be changed without complicating the structure of the connecting part.

A radio communication terminal according to an embodiment of the invention is characterized by further including an internal wire communication unit that transfers part of the data to be displayed on the display from the first casing to the second casing by internal wire communication during transmission or reception of external radio communication.

Accordingly, specific data to be displayed on the display can be transmitted from the first casing to the second casing without interference even when transmission or reception by external radio communication is being carried out. Accordingly, it is possible to decrease the amount of data transmitted by internal wire communication while at the same time allowing necessary data to be displayed on the display, thereby preventing the complication of the structure of the connecting part while dealing with an increase in the amount of data exchanged between the first casing and the second casing.

A radio communication terminal according to an embodiment of the invention is characterized in that the internal wire communication unit transmits part of the data to be displayed on the display via a power supply line provided between the first casing and the second casing.

Accordingly, part of the data to be displayed on the display can be transmitted from the first casing to the second casing by internal wire communication while preventing an increase in the number of wires between the first casing and the second casing, thereby preventing the complication of the structure of the connecting part.

According to an embodiment of the present invention, there is provided a method of controlling internal radio communication in which data transmission between casings having an external radio communication function is performed by internal radio communication. The method is characterized in that the internal radio communication between the casings is timed to be carried out when external radio transmission from the casings is stopped.

This can prevent the occurrence of interference between the internal radio communication between the casings and the external radio communication from the casings. The degradation in the quality of the internal radio communication between the casings is thus prevented by allowing for a change in the state of the external radio communication. It is thereby possible to deal with an increase in the amount of data transmission between the casings while providing flexibility in the positional relationship between the casings.

DETAILED DESCRIPTION

A radio communication terminal and a method of controlling radio communication according to embodiments of the invention will be described hereinbelow with reference to the drawings.

Figure 1:
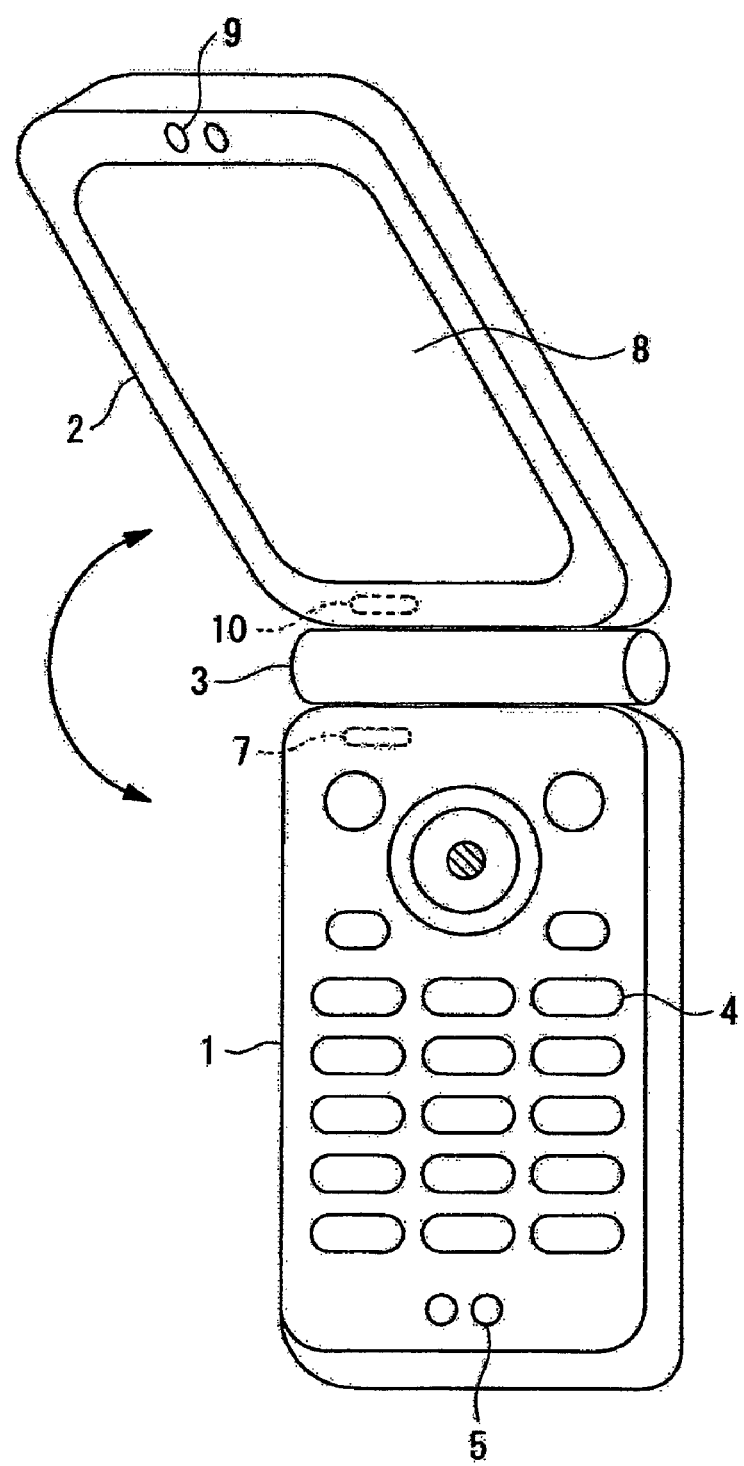
FIG. 1 is a perspective view showing a state in which a clamshell cellular telephone incorporating a method of controlling radio communication according to the present invention is in an opened state.
Figure 2:
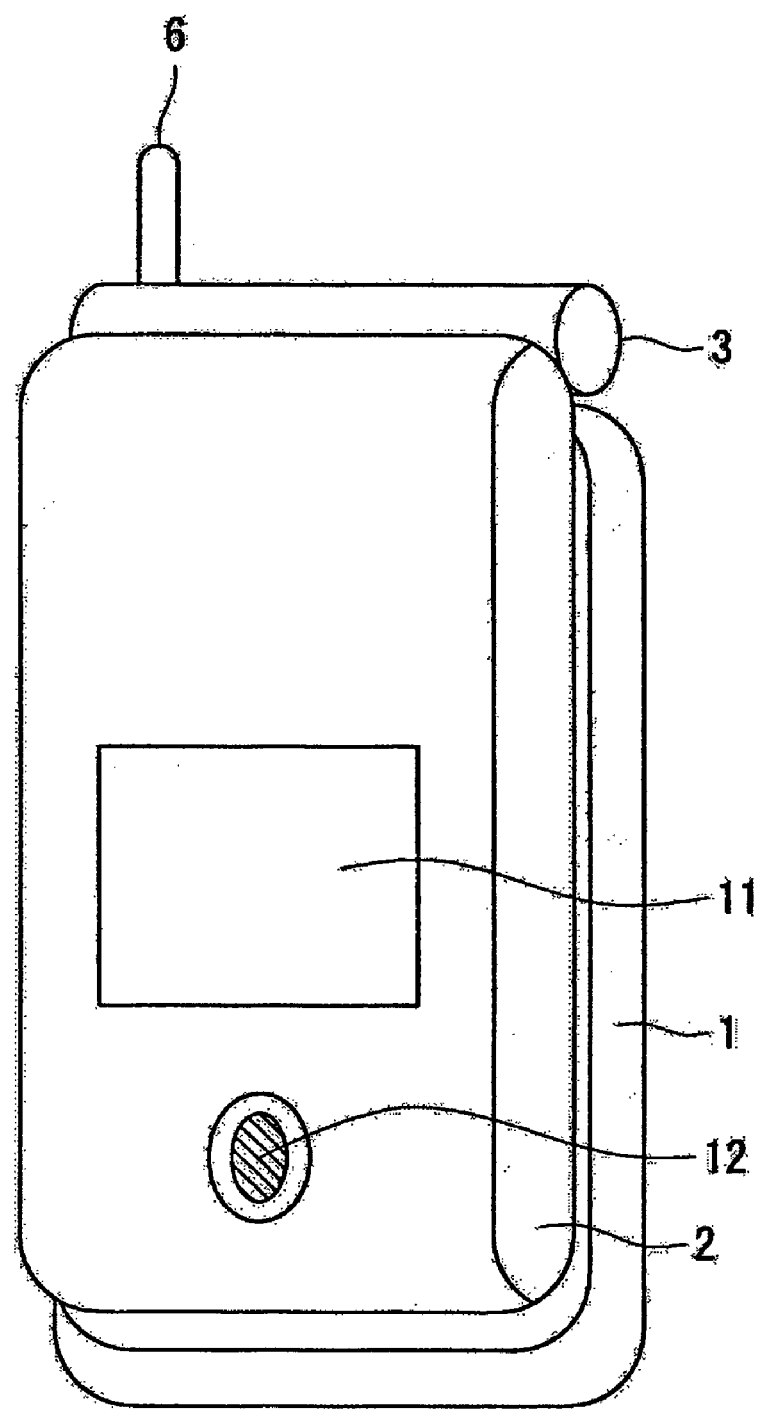
FIG. 2 is a perspective view showing a state in which the clamshell cellular telephone incorporating the method of controlling radio communication according to the invention is in a closed state.

FIG. 1 is a perspective view showing a state in which a clamshell cellular telephone incorporating the method of controlling radio communication according to the present invention is in an opened state; and FIG. 2 is a perspective view showing a state in which the clamshell cellular telephone incorporating the method of controlling radio communication according to the invention is in a closed state.

Referring to FIGS. 1 and 2, a first casing 1 has operation buttons 4 on the surface, a microphone 5 at the lower end, and an external radio communication antenna 6 on the upper end. A second casing 2 has a display 8 on the front surface and a speaker 9 on the upper end. On the back of the second casing 2 is provided a display 11 and a photographing device 12. As the displays 8 and 11, a liquid-crystal display panel, an organic EL panel, or a plasma display panel may be used. As the photographing device 12, a CCD or CMOS sensor may be used. The first casing 1 and the second casing 2 have internal radio communication antennas 7 and 10, respectively, for internal radio communication between the first casing 1 and the second casing 2.

The first casing 1 and the second casing 2 are connected to each other with a hinge 3. The second casing 2 can be folded onto the first casing 1 by rotating the second casing 2 with the hinge 3 as the fulcrum. The operation buttons 4 can be protected by the second casing 2 by closing the second casing 2 onto the first casing 1, thereby preventing unintended operation of the operation buttons 4 while the cellular telephone is taken on the road. When the second casing 2 is opened away from the first casing 1, the user can operate the operation buttons 4 while viewing the display 8, talk while using the speaker 9 and the microphone 5, and photograph images while operating the operation buttons 4.

The use of the clamshell structure allows the display 8 to be disposed substantially over the entire second casing 2, increasing the size of the display 8 to improve viewability without loss in the portability of the cellular telephone.

Since the internal radio communication antennas 7 and 10 are disposed in the first casing 1 and the second casing 2, respectively, data transmission between the first casing 1 and the second casing 2 can be made by internal radio communication using the internal radio communication antennas 7 and 10. For example, image data and voice data taken into the first casing 1 via the external radio communication antenna 6 can be sent to the second casing 2 by internal radio communication using the internal radio communication antennas 7 and 10, to allow images to be displayed on the display 8 or voice to be outputted from the speaker 9. The data taken by the image photographing device 12 can be sent from the second casing 2 to the first casing 1 by the internal radio communication using the internal radio communication antennas 7 and 10 and can be sent to the outside via the external radio communication antenna 6.

This eliminates the need for data transmission between the first casing 1 and the second casing 2 by wire, thus eliminating the necessity for passing a multipin flexible wiring board through the hinge 3. This prevents the complication of the structure of the hinge 3 and the complication of the mounting process, reduces the size and width of the cellular telephone, provides higher reliability, and increases the size of the screen and increases the number of functions of the cellular telephone without loss in portability.

Figure 3:
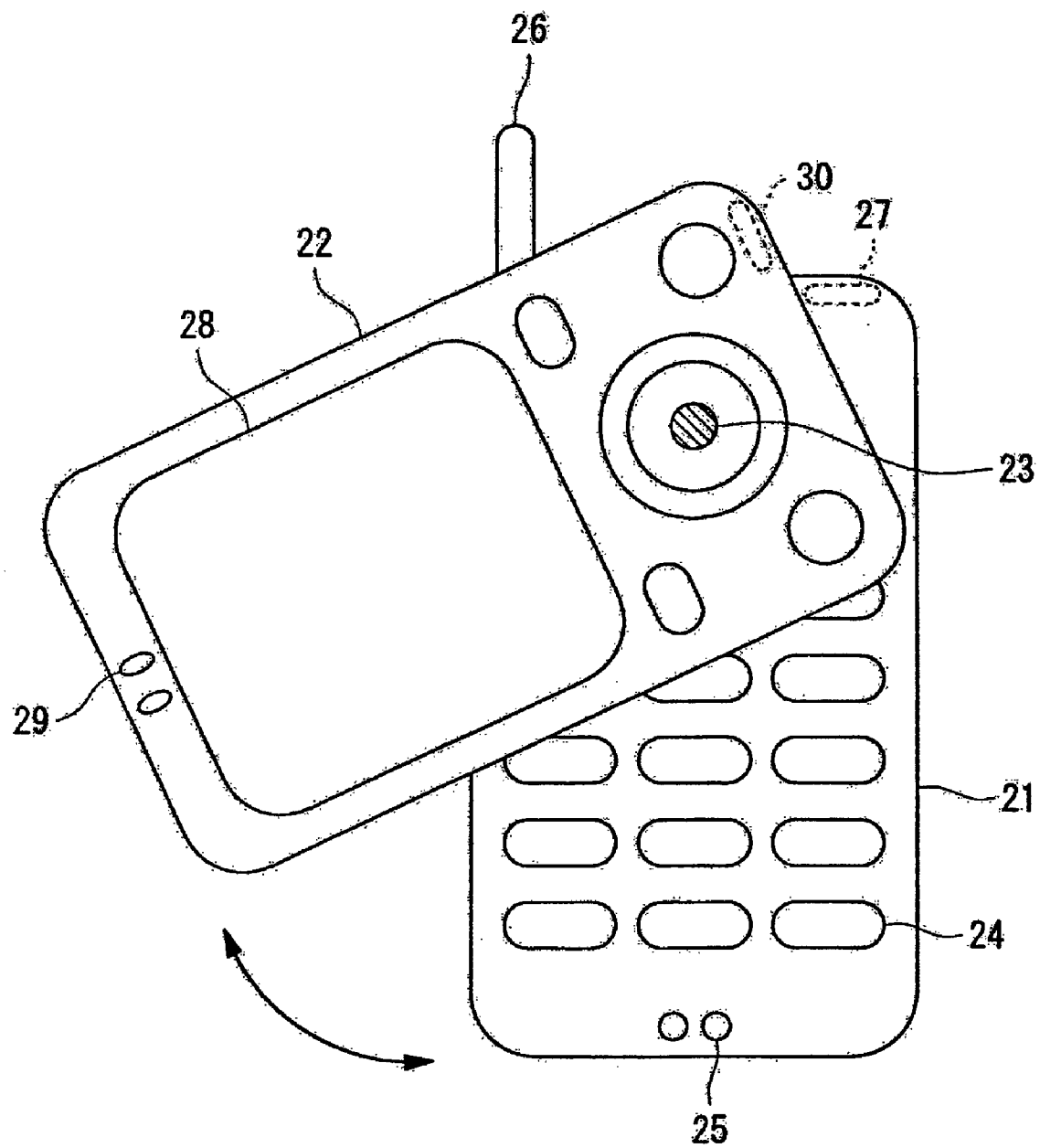
FIG. 3 is a perspective view showing the appearance of a rotary lid cellular telephone incorporating the method of controlling radio communication according to the invention.

FIG. 3 is a perspective view showing the appearance of a rotary lid cellular telephone incorporating the method of controlling radio communication according to the invention.

Referring to FIG. 3, a first casing 21 has operation buttons 24 on the surface, a microphone 25 at the lower end, and an external radio communication antenna 26 on the upper end. A second casing 22 has a display 28 on the front surface and a speaker 29 on the upper end. The first casing 21 and the second casing 22 have internal radio communication antennas 27 and 30, respectively, for internal radio communication between the first casing 21 and the second casing 22.

The first casing 21 and the second casing 22 are connected to each other with a hinge 23. The second casing 22 can be placed over the first casing 21 or shifted away from the first casing 21 by rotating the second casing 22 horizontally with the hinge 23 as the point of rotation. The operation buttons 24 can be protected by the second casing 22 by placing the second casing 22 over the first casing 21, thereby preventing unintended operation of the operation buttons 24 while the cellular telephone is being carried. When the second casing 22 is shifted away from the first casing 21 by rotating the second casing 22 horizontally, the user can operate the operation buttons 24 while viewing the display 28, and talk while using the speaker 29 and the microphone 25.

Since the internal radio communication antennas 27 and 30 are disposed in the first casing 21 and the second casing 22, respectively, data transmission between the first casing 21 and the second casing 22 can be made by internal radio communication using the internal radio communication antennas 27 and 30. For example, image data and voice data taken into the first casing 21 via the external radio communication antenna 26 can be sent to the second casing 22 by the internal radio communication using the internal radio communication antennas 27 and 30 to allow images to be displayed on the display 28 or voice to be outputted from the speaker 29.

This eliminates the necessity for passing a multipin flexible wiring board through the hinge 23, preventing the complication of the structure of the hinge 23 and the complication of the mounting process. This allows reduction of the size and width of a cellular telephone while providing higher reliability, and increases the size of the screen and the function of the cellular telephone without loss of portability.

While the foregoing embodiment has been described for cellular telephones as examples, the invention can be applied to video cameras, personal digital assistants (PDAs), notebook personal computers, and so forth.

Figure 4:
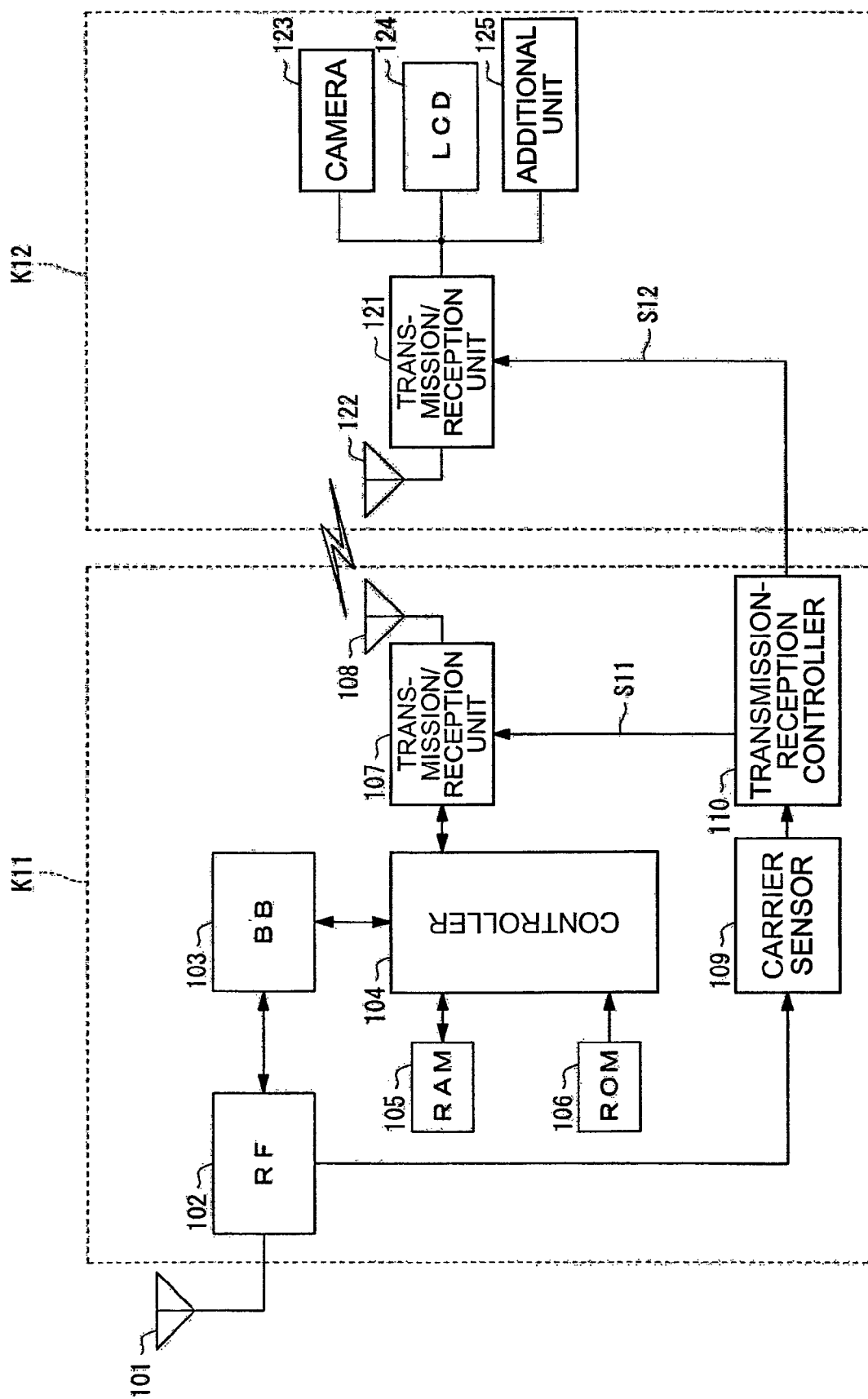
FIG. 4 is a block diagram showing the schematic structure of a radio communication terminal according to a first embodiment of the invention.

FIG. 4 is a block diagram showing the schematic structure of a radio communication terminal according to a first embodiment of the invention.

Referring to FIG. 4, a first casing K11 includes an external radio communication antenna 101 for transmitting and receiving external radio communication waves, a radio processing unit 102 for modulating and demodulating signals transmitted/received via the external radio communication antenna 101, a baseband-signal processing unit 103 for baseband signal processing, a controller 104 for controlling the entire radio communication terminal, a RAM 105 that provides a work area where the controller 104 executes the processing and stores results of the processing, a ROM 106 that stores various control programs for operating the radio communication terminal, a transmission/reception unit 107 that controls internal radio communication via an internal radio communication antenna 108, the internal radio communication antenna 108 for transmitting and receiving internal radio communication waves at the first casing K11, a carrier sensor 109 that senses the input and output levels of the radio processing unit 102, and a transmission-reception controller 110 that stops the operation of the transmission/reception units 107 and 121 by wire according to the output level sensed by the carrier sensor 109.

A second casing K12 includes a transmission/reception unit 121 that controls internal radio communication via an internal radio communication antenna 122, an internal radio communication antenna 122 for transmitting and receiving internal radio communication waves at the second casing K12, a camera 123 for image photographing, a liquid-crystal display 124 for data display, and additional units 125. The transmission/reception data in external radio communication includes voice data of a phone call and written character data and image data of e-mail. The transmission/reception data in internal radio communication includes image data taken by the camera 123, display data to be displayed on the liquid-crystal display 124, and a control signal for controlling the second casing K12. As the controller 104, a CPU can be used. The additional units 125 include, for example, an LED, a microphone, and a speaker.

The first casing K11 and the second casing K12 are connected together such that their relative positional relationship can be varied. Methods for changing the positional relationship between the first casing K11 and the second casing K12 include a method of rotating the second casing 2 horizontally along the front surface of the first casing 1 and a method of sliding the second casing 2 rightward/leftward or forward/backward relative to the first casing 1, in addition to the method of folding the second casing 2 onto the first casing 1.

When data is to be transmitted via the external radio communication antenna 101, transmission data sent to the baseband-signal processing unit 103 is subjected to baseband signal processing. The transmission data outputted from the baseband-signal processing unit 103 is modulated by the radio processing unit 102 and transmitted to the outside via the external radio communication antenna 101. On the other hand, when data is received via the external radio communication antenna 101, this is sent to the radio processing unit 102, where the data is demodulated. The reception data outputted from the radio processing unit 102 is sent to the baseband-signal processing unit 103, where the data is subjected to baseband signal processing and then outputted to the controller 104.

The signal sent from the radio processing unit 102 or the signal received by the radio processing unit 102 is sent to the carrier sensor 109, so that the carrier sensor 109 can sense the input/output level of the radio processing unit 102.

Figure 5:
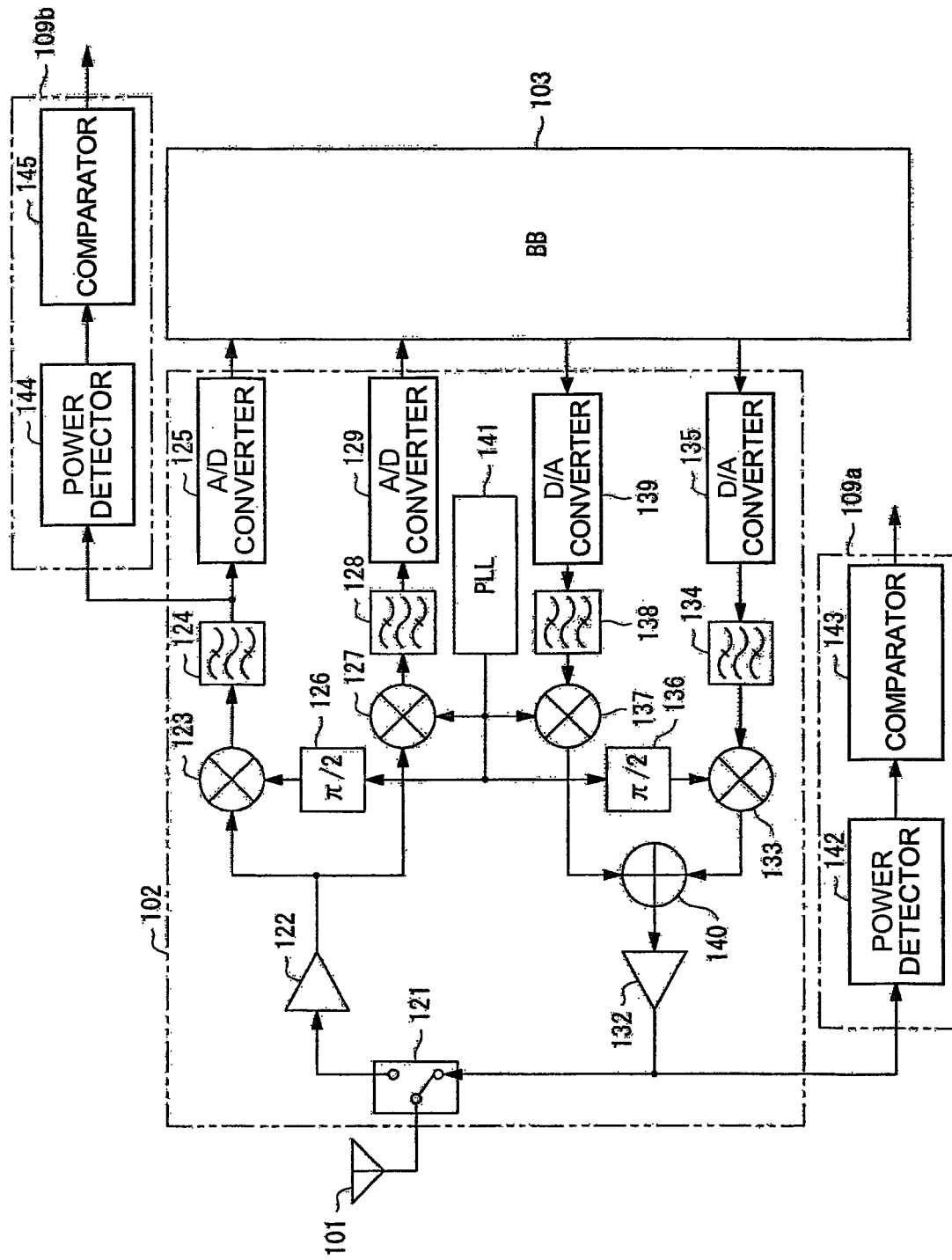
FIG. 5 is a block diagram showing the schematic structure of the radio processing unit and the carrier sensor of FIG. 4.

FIG. 5 is a block diagram showing the schematic structure of the radio processing unit 102 and the carrier sensor 109 of FIG. 4.

Referring to FIG. 5, the radio processing unit 102 includes a switch 121, power amplifiers 122 and 132, mixers 123, 127, 133, and 137, filters 124, 128, 134, and 138, A/D converters 125 and 129, D/A converters 135 and 139, phase shifters 126 and 136, an adder 140, and a PLL circuit 141. The carrier sensor 109 includes a carrier sensor 109a that senses the output level during transmission and a carrier sensor 109b that senses the input level during reception. The carrier sensor 109a has a power detector 142 and a comparator 143, while the carrier sensor 109b has a power detector 144 and a comparator 145. The carrier sensor 109b may be omitted.

When signals are to be received, the switch 121 is switched to the power amplifier 122. The signal received via the external radio communication antenna 101 is sent to the mixers 123 and 127 via the power amplifier 122. To the mixer 123 is inputted a local oscillation signal generated by the PLL circuit 141 via the phase shifter 126; to the mixer 127 is directly inputted a local oscillation signal generated by the PLL circuit 141.

The signal outputted from the power amplifier 122 is mixed with the phase-shifted local oscillation signal by the mixer 123, and a desired frequency is extracted by the filter 124. The signal outputted from the filter 124 is digitized by the A/D converter 125 and then sent to the baseband-signal processing unit 103. Also, the signal outputted from the power amplifier 122 is mixed with the local oscillation signal by the mixer 127, and a desired frequency is extracted by the filter 128. The signal outputted from the filter 128 is digitized by the A/D converter 129 and then sent to the baseband-signal processing unit 103.

Also, the signal outputted from the filter 124 is sent to the power detector 144, where the input level of the signal is sensed. The input level sensed by the power detector 144 is compared with a specified value by the comparator 145 and the result of the comparison is sent to the transmission-reception controller 110 in FIG. 4.

When signals are to be transmitted, the switch 121 is switched to the power amplifier 132. The signals outputted from the baseband-signal processing unit 103 are changed to analog by the D/A converters 135 and 139, and a desired frequency is extracted by the filters 134 and 138. The signals outputted from the filters 134 and 138 are sent to the mixers 133 and 137, respectively. To the mixer 133 is inputted the local oscillation signal generated by the PLL circuit 141 via the phase shifter 136; to the mixer 137 is directly inputted the local oscillation signal generated by the PLL circuit 141. The signal outputted from the filter 134 is mixed with the phase-shifted local oscillation signal by the mixer 133 and then sent to the adder 140. The signal outputted from the filter 138 is mixed with the local oscillation signal by the mixer 137 and then sent to the adder 140. The signals outputted from the mixers 133 and 137 are added by the adder 140, are then sent to the external radio communication antenna 101 via the power amplifier 132, and are transmitted to the outside via the external radio communication antenna 101.

The signal outputted from the power amplifier 132 is sent to the power detector 142, where the input level is sensed. The output level sensed by the power detector 142 is compared with a specified value by the comparator 143, and the result of the comparison is sent to the transmission-reception controller 110 in FIG. 4.

After the input/output level during the external radio communication is sensed by the carrier sensor 109, the transmission-reception controller 110 can then stop the operation of the transmission/reception units 107 and 121 depending on this input/output level sensed by the carrier sensor 109.

Here, as a communication scheme for the external radio communication of the radio communication terminal, time division multiple access (TDMA), a kind of multiple access scheme, can be used.

Figure 6:
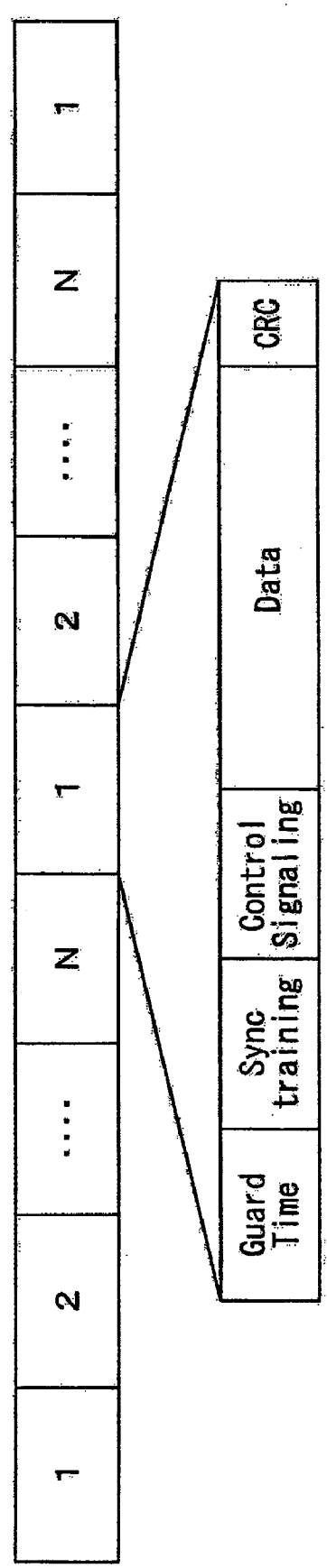
FIG. 6 is a diagram showing the slot structure of a TDMA.

FIG. 6 is a diagram showing the slot structure of the TDMA.

Referring to FIG. 6, in the TDMA the use of one frequency band is divided into time periods of a fixed length, so that multiple users can share one frequency band, each using the band in turn for the fixed period. More specifically, the use of the frequency band is divided into time periods and allocated to radio communication terminals, so that the users can use the entire bandwidth during their allocated time. The radio communication terminals send signals continuously and periodically. Between communications of the radio communication terminals, a guard time is provided to prevent the coincidence of bursts from the radio communication terminals due to the difference in the distances between the respective radio communication terminals and the base station or any error in transmission timing.

FIG. 7 is a diagram showing a method of controlling the internal communication of the radio communication terminal of FIG. 4.

Figure 7A:
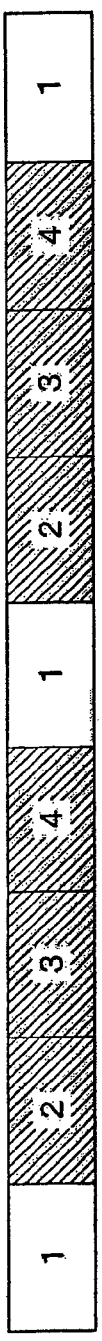
FIG. 7 is a diagram showing a method of controlling the internal communication of the radio communication terminal of FIG. 4.
Figure 7B:
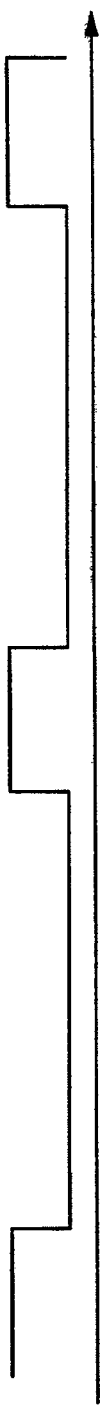
Figure 7C:

Referring to FIG. 7(a), assuming the transmission timing to be such that among slots 1 to 4, slot 1 is allocated to the radio communication terminal of a user, data is not transmitted from the radio communication terminal of the user to the base station in the other slots 2 to 4. Accordingly, the carrier sensor 109 of FIG. 4 can detect the transmission timing allocated to the user's radio communication terminal by monitoring the input/output level of the radio processing unit 102. Referring to FIG. 7(b), the transmission-reception controller 110 generates transmission timing signals S11 and S12 based on the output levels sensed by the carrier sensor 109 and outputs the transmission timing signals S11 and S12 by wire to the transmission/reception units 107 and 121, respectively. When the transmission/reception units 107 and 121 receive the transmission timing signals S11 and S12 from the transmission-reception controller 110, the operation of transmission/reception units 107 and 121 can be stopped while the transmission timing signals are ON, as shown in FIG. 7(c).

On the other hand, when the transmission timing signal S11 is not outputted by the transmission-reception controller 110, the transmission/reception unit 107 can send image data and voice data sent from the controller 104 via the internal radio communication antenna 108. When the image data and the voice data are sent via the internal radio communication antenna 108, they are received via the internal radio communication antenna 122. The transmission/reception unit 121 can thus display the image data received via the internal radio communication antenna 122 on the liquid-crystal display 124 and output the voice data received via the internal radio communication antenna 122 from the speaker.

When the transmission timing signal S12 is not outputted by the transmission-reception controller 110, the transmission/reception unit 121 can send the image data taken by the camera 123 via the internal radio communication antenna 122. When the photograph data is sent via the internal radio communication antenna 122, it is received via the internal radio communication antenna 108. The transmission/reception unit 107 can send the photograph data received via the internal radio communication antenna 108 to the controller 104. The controller 104 can process the photograph data sent from the second casing K12 or store it in the RAM 105.

Thus, the internal radio communication using the internal radio communication antennas 108 and 122 can be stopped during use of slot 1, and performed during use of the other slots 2 to 4. Thus, it is possible to cause internal radio communication between the first casing K11 and the second casing K12 to be performed only when no external radio communication is performed, preventing the interference with external radio communication. This allows more compact and thinner radio communication terminals with higher reliability while reducing cost, larger screens, and provision of a greater number of functions in radio communication terminals without losing portability.

Also, since the transmission timing allocated to the radio communication terminal of the user is determined from the result of monitoring the input/output level of the radio processing unit 102, the complication of the circuit structure and an increase in the size thereof can be prevented and power saving can be achieved, e.g., wasteful retransmission can be prevented and transmission power of internal radio communication can be decreased.

A concrete example of the radio communication terminal includes a cellular telephone. Accordingly, when a cellular telephone adopts a clamshell structure, stable data transmission between the first casing K11 and the second casing K12 can be performed by radio. Even when the amount of data exchanged between the first casing K11 and the second casing K12 increases with higher resolution and larger screen of the liquid-crystal display 124 mounted to the cellular telephone, an increase in the number of wires between the first casing K11 and the second casing K12 can be prevented, thereby preventing the complication of the hinge structure and the mounting process.

As the internal radio communication using the internal radio communication antennas 108 and 122, short-range radio such as weak radio or ultra-wideband (UWB) radio can be used. This allows stable internal radio communication while reducing the output level in internal radio communication. Thus, even when the amount of data transmission between the first casing K11 and the second casing K12 increases, the data transmission between the first casing K11 and the second casing K12 can be made without exceeding the limitations set by legal regulations, preventing an increase in the number of wires between the first casing K11 and the second casing K12.

The embodiment of FIG. 4 shows a method in which the transmission-reception controller 110 outputs the transmission timing signals S11 and S12 to the transmission/reception units 107 and 121, respectively. However the transmission-reception controller 110 may be configured so as to output the transmission timing signal S11 to the transmission/reception unit 107 and not output the transmission timing signal S12 to the transmission/reception unit 121.

In the foregoing embodiment, TDMA has been described as an example of an external radio communication format. However, instead of the TDMA, another multiple access scheme such as frequency division multiple access (FDMA) or code division multiple access (CDMA) may be applied.

It is also possible to transmit part of the data to be displayed on the liquid-crystal display 124 from the first casing K11 to the second casing K12 by internal wire communication during transmission or reception of external radio communication. Further, the data to be displayed on the liquid-crystal display 124 may include data on the remaining capacity of a battery, time of day, and outside calling area. Also, part of data to be displayed on the liquid-crystal display 124 may be transmitted via the power supply line disposed between the first casing K11 and the second casing K12.

The method of stopping the transmission of internal radio communication when it is detected that external radio communication is being carried out has been described. Alternatively, the transmission of internal radio communication may be stopped when the reception of external radio communication is detected. This can prevent interference with external radio communication.

Figure 8:
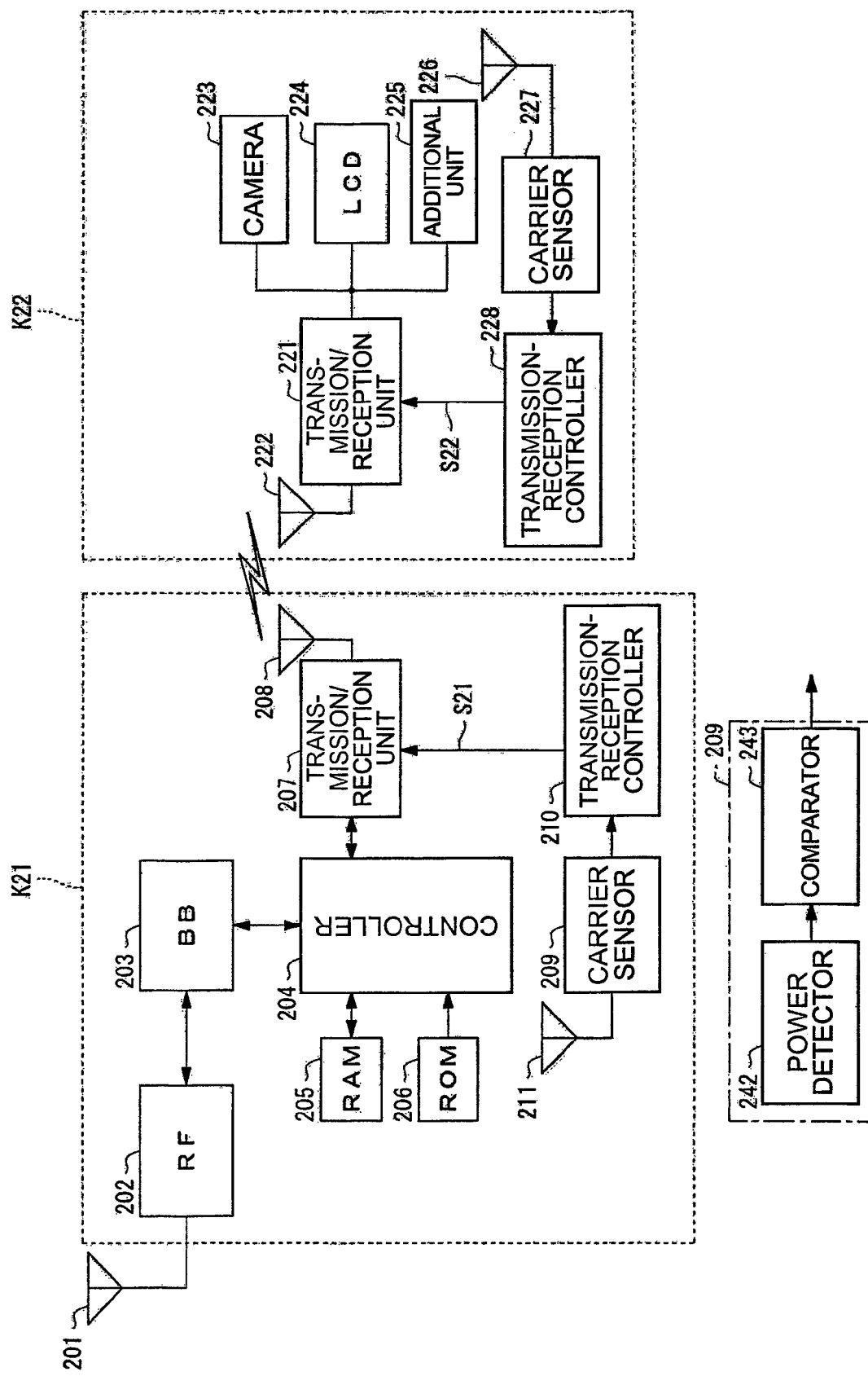
FIG. 8 is a block diagram showing the schematic structure of a radio communication terminal according to a second embodiment of the invention.

FIG. 8 is a block diagram showing the schematic structure of a radio communication terminal according to a second embodiment of the invention.

Referring to FIG. 8, a first casing K21 includes an external radio communication antenna 201, a radio processing unit 202, a baseband-signal processing unit 203, a controller 204, a RAM 205, a ROM 206, a transmission/reception unit 207, an internal radio communication antenna 208, a carrier sensor 209, a transmission-reception controller 210, and a carrier sensing antenna 211. A second casing K22 includes a transmission/reception unit 221, an internal radio communication antenna 222, a camera 223, a liquid-crystal display 224, additional units 225, a carrier sensing antenna 226, a carrier sensor 227, and a transmission/reception controller 228. The carrier sensors 209 and 227 have a power detector 242 and a comparator 243. The first casing K21 and the second casing K22 are connected together such that their relative positional relationship can be varied.

When data is transmitted via the external radio communication antenna 201, transmission data sent to the baseband-signal processing unit 203 is subjected to baseband signal processing. The transmission data outputted from the baseband-signal processing unit 203 is modulated by the radio processing unit 202 and sent to the outside via the external radio communication antenna 201. On the other hand, when data is received via the external radio communication antenna 201, this is sent to the radio processing unit 202, where the data is demodulated. The reception data outputted from the radio processing unit 202 is sent to the baseband-signal processing unit 203, where the data is subjected to baseband signal processing and then outputted to the controller 204.

The radio wave sent via the external radio communication antenna 201 is received by the carrier sensing antennas 211 and 226, from which the carrier signals are sent to the carrier sensors 209 and 227, respectively. The carrier sensors 209 and 227, which have received the carrier signals received by the carrier sensing antennas 211 and 226, determine the output levels of the carrier signals and output these values to the transmission-reception controllers 210 and 228, respectively.

The transmission-reception controllers 210 and 228 generate transmission timing signals S21 and S22 depending on the output levels sensed by the carrier sensors 209 and 227 and output the transmission timing signals S21 and S22 to the transmission/reception units 207 and 221, respectively. When the transmission/reception units 207 and 221 receive the transmission timing signals S21 and S22 from the transmission-reception controllers 210 and 228, respectively, transmission/reception units 207 and 221 can stop their operation.

On the other hand, when the transmission timing signal S21 is not outputted by the transmission-reception controller 210, the transmission/reception unit 207 can send image data and voice data sent from the controller 204 through the internal radio communication antenna 208. When the image data and the voice data are sent through the internal radio communication antenna 208, they are received through the internal radio communication antenna 222. The transmission/reception unit 221 can thus display the image data received via the internal radio communication antenna 222 on the liquid-crystal display 224 and output the voice data received via the internal radio communication antenna 222 from the speaker.

When the transmission timing signal S22 is not outputted by the transmission-reception controller 228, the transmission/reception unit 221 can send the image data taken by the camera 223 via the internal radio communication antenna 222. When the photograph data is sent through the internal radio communication antenna 222, it is received through the internal radio communication antenna 208. The transmission/reception unit 207 can send the photograph data received via the internal radio communication antenna 208 to the controller 204. The controller 204 can thus process the photograph data sent from the second casing K22 and store it in the RAM 205.

Thus, the output level of the radio wave sent through the external radio communication antenna 201 can be directly monitored in both the first casing K21 and the second casing K22. This allows the operation of both transmission/reception units 107 and 121 to be stopped during external radio communication without wire connection, preventing degradation in the quality of internal radio communication between the first casing K21 and the second casing K22 while allowing for a change in the state of external radio communication.

Figure 9:
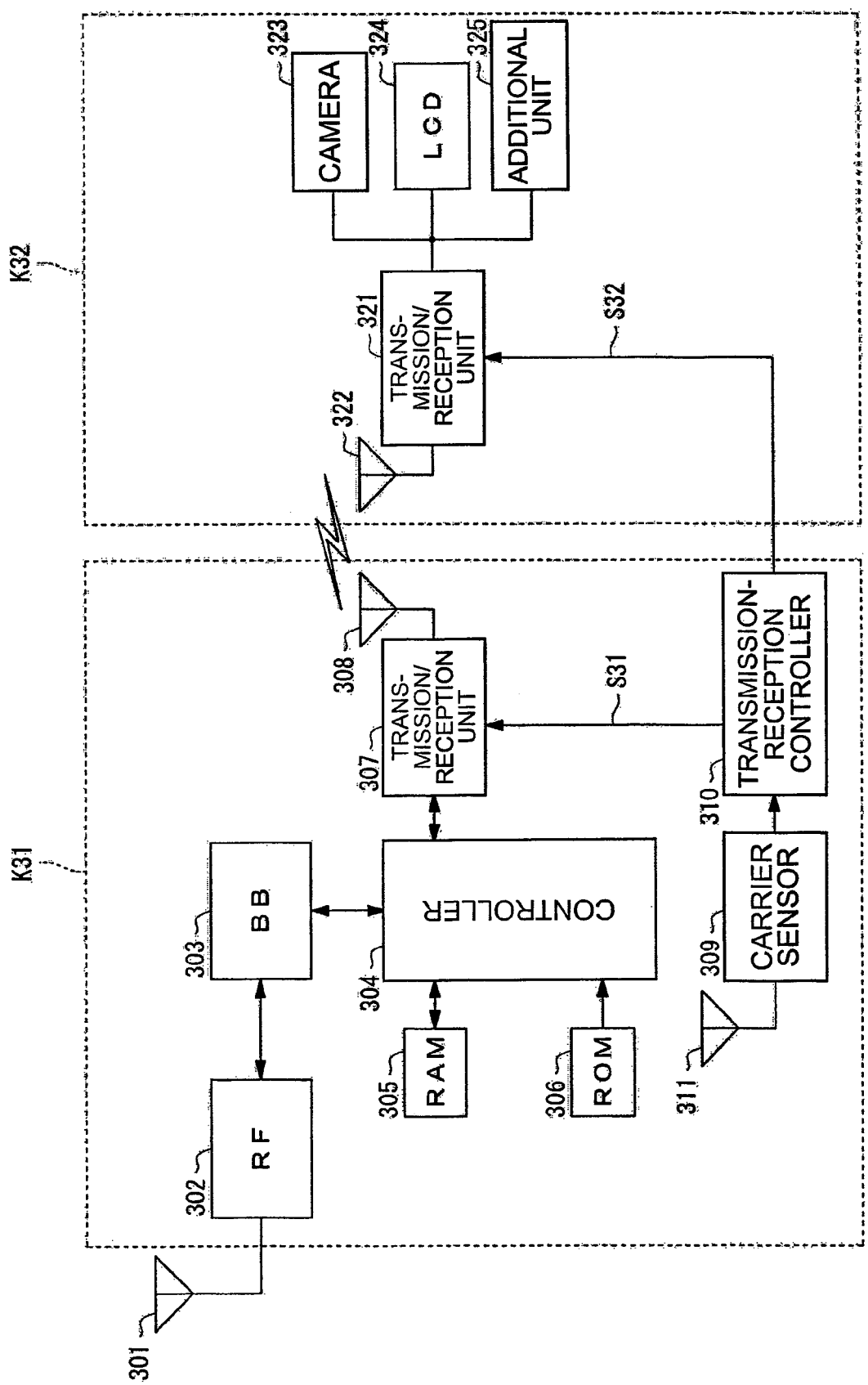
FIG. 9 is a block diagram showing the schematic structure of a radio communication terminal according to a third embodiment of the invention.

FIG. 9 is a block diagram showing the schematic structure of a radio communication terminal according to a third embodiment of the invention.

Referring to FIG. 9, a first casing K31 includes an external radio communication antenna 301, a radio processing unit 302, a baseband-signal processing unit 303, a controller 304, a RAM 305, a ROM 306, a transmission/reception unit 307, an internal radio communication antenna 308, a carrier sensor 309, a transmission-reception controller 310, and a carrier sensing antenna 311. A second casing K32 includes a transmission/reception unit 321, an internal radio communication antenna 322, a camera 323, a liquid-crystal display 324, and additional units 325. The first casing K31 and the second casing K32 are connected together such that their relative positional relationship can be varied.

A radio wave sent through the external radio communication antenna 301 is received by the carrier sensing antenna 311, from which the carrier signal is sent to the carrier sensor 309. The carrier sensor 309, which has received the carrier signal received by the carrier sensing antenna 311, determines the output level of the carrier signal and outputs the determined value to the transmission-reception controller 310.

The transmission-reception controller 310 generates transmission timing signals S31 and S32 based on the output level sensed by the carrier sensor 309 and outputs the transmission timing signals S31 and S32 to the transmission/reception units 307 and 321, respectively. When the transmission/reception units 307 and 321 receive the transmission timing signals S31 and S32 from the transmission-reception controller 310, it is possible to stop the operation of the transmission/reception units 307 and 321.

Thus the output level of the radio wave sent through the external radio communication antenna 301 can be directly monitored. Accordingly, even when it is difficult for the controller 304 to determine the transmission timing of external radio communication, a determination can be made whether a radio wave is being sent through the external radio communication antenna 301. This allows internal radio communication between the first casing K31 and the second casing K32 when no external radio communication is being performed, thereby achieving more compact and thinner radio communication terminals with higher reliability at a low cost, increased size of the screens, and a greater number of functions of the radio communication terminal without losing portability.

The embodiment of FIG. 9 shows a method in which the transmission-reception controller 310 outputs the transmission timing signals S31 and S32 to the transmission/reception units 307 and 321, respectively. Alternatively, the transmission-reception controller 310 may be configured so as to output the transmission timing signal S31 to the transmission/reception unit 307 and not output the transmission timing signal S32 to the transmission/reception unit 321.

Figure 10:
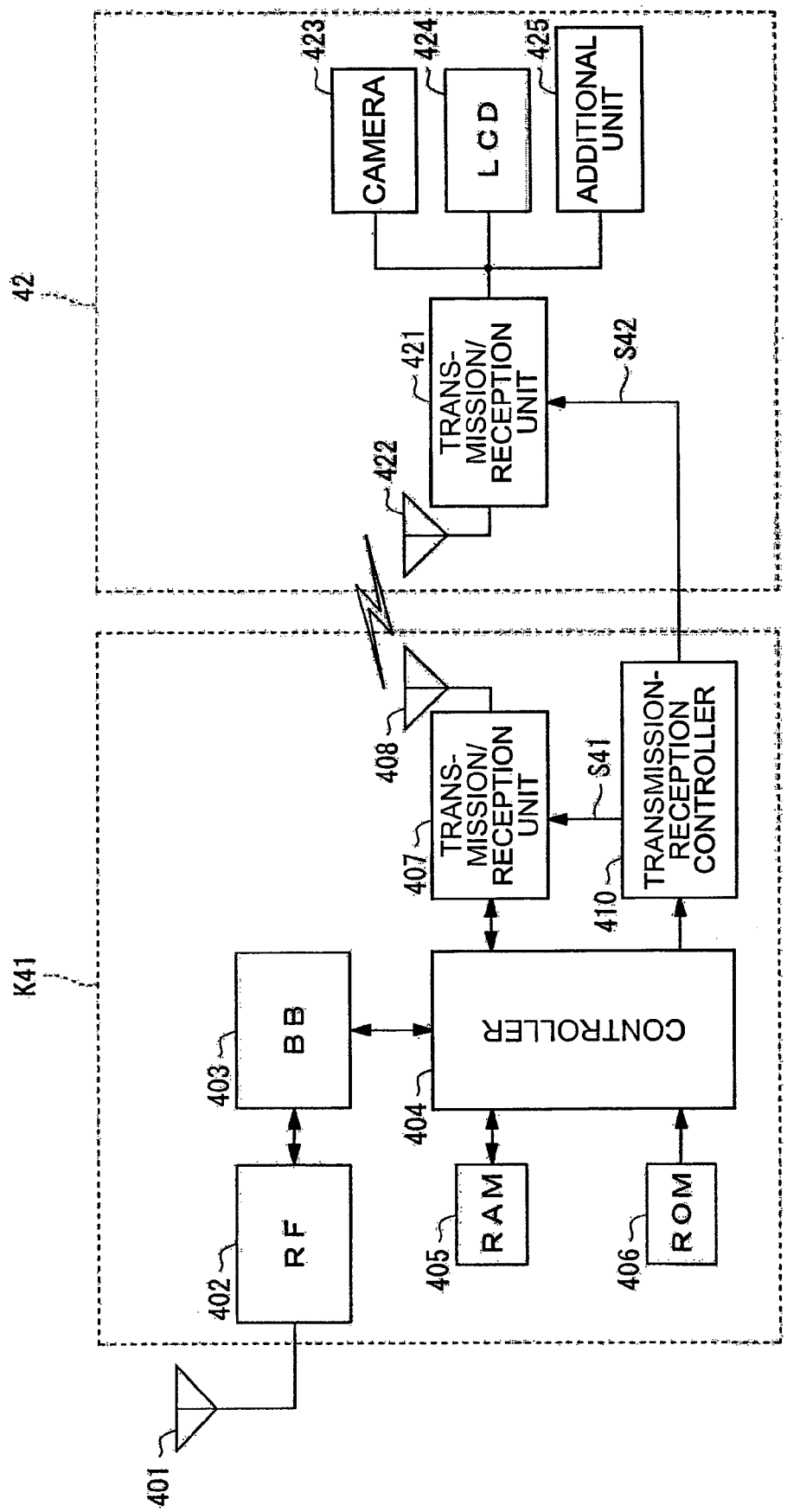
FIG. 10 is a block diagram showing the structure of a radio communication terminal according to a fourth embodiment of the invention.

FIG. 10 is a block diagram showing the structure of a radio communication terminal according to a fourth embodiment of the invention.

Referring to FIG. 10, a first casing K41 includes an external radio communication antenna 401, a radio processing unit 402, a baseband-signal processing unit 403, a controller 404, a RAM 405, a ROM 406, a transmission/reception unit 407, an internal radio communication antenna 408, and a transmission-reception controller 410. A second casing K42 includes a transmission/reception unit 421, an internal radio communication antenna 422, a camera 423, a liquid-crystal display 424, and additional units 425. The first casing K41 and the second casing K42 are connected together so that their relative positional relationship can be varied.

When data is transmitted through the external radio communication antenna 401, the controller 404 sends transmission data to the baseband-signal processing unit 403 and notifies the transmission-reception controller 410 of the timing by which the data is transmitted. When the data is sent from the controller 404, the baseband-signal processing unit 403 applies baseband signal processing to the transmission data and outputs it to the radio processing unit 402. When the radio processing unit 402 receives the baseband processed transmission data, it modulates the transmission data and then sends it to the outside via the external radio communication antenna 401.

When the transmission-reception controller 410 is notified of the data transmission timing by the controller 404, the transmission-reception controller 410 generates transmission timing signals S41 and S42 and outputs them to the transmission/reception units 407 and 421, respectively. When the transmission/reception units 407 and 421 receive the transmission timing signals S41 and S42 from the transmission-reception controller 410, they can stop the operation of the transmission/reception units 407 and 421, respectively.

Accordingly, by receiving transmission timing information from the controller 404, it becomes possible to determine whether radio waves are being transmitted via the external radio communication antenna 401. Thus, it becomes possible to cause internal radio communication between the first casing K41 and the second casing K42 to be carried out when no external radio communication is performed, while preventing the complication of the circuit structure and an increase in the size thereof, thereby allowing more compact and thinner radio communication terminals with higher reliability at a low cost, increase in the size of the screens, and a greater number of functions of the radio communication terminal without losing portability.

The external communication protocol of radio communication terminals can be predetermined depending on the operation mode such as standby, conversation, and packet communication. Accordingly, for example, for TDMA or packet communication, the controller 404 can know transmission/reception timing in advance. Thus, the transmission-reception controller 410 may stop the operation of the transmission/reception units 407 and 421 according to a time schedule determined depending on the transmission/reception timing of external radio communication.

This allows internal radio communication during the external radio communication idle time, preventing degradation in the quality of internal radio communication between the first casing K41 and the second casing K42 while preventing a decrease in the efficiency of the internal radio communication.

The embodiment of FIG. 10 shows a method in which the transmission-reception controller 410 outputs the transmission timing signals S41 and S42 to the transmission/reception units 407 and 421, respectively. Alternatively, the transmission-reception controller 410 may be configured to output the transmission timing signal S41 to the transmission/reception unit 407 and not output the transmission timing signal S42 to the transmission/reception unit 421.

Figure 11:
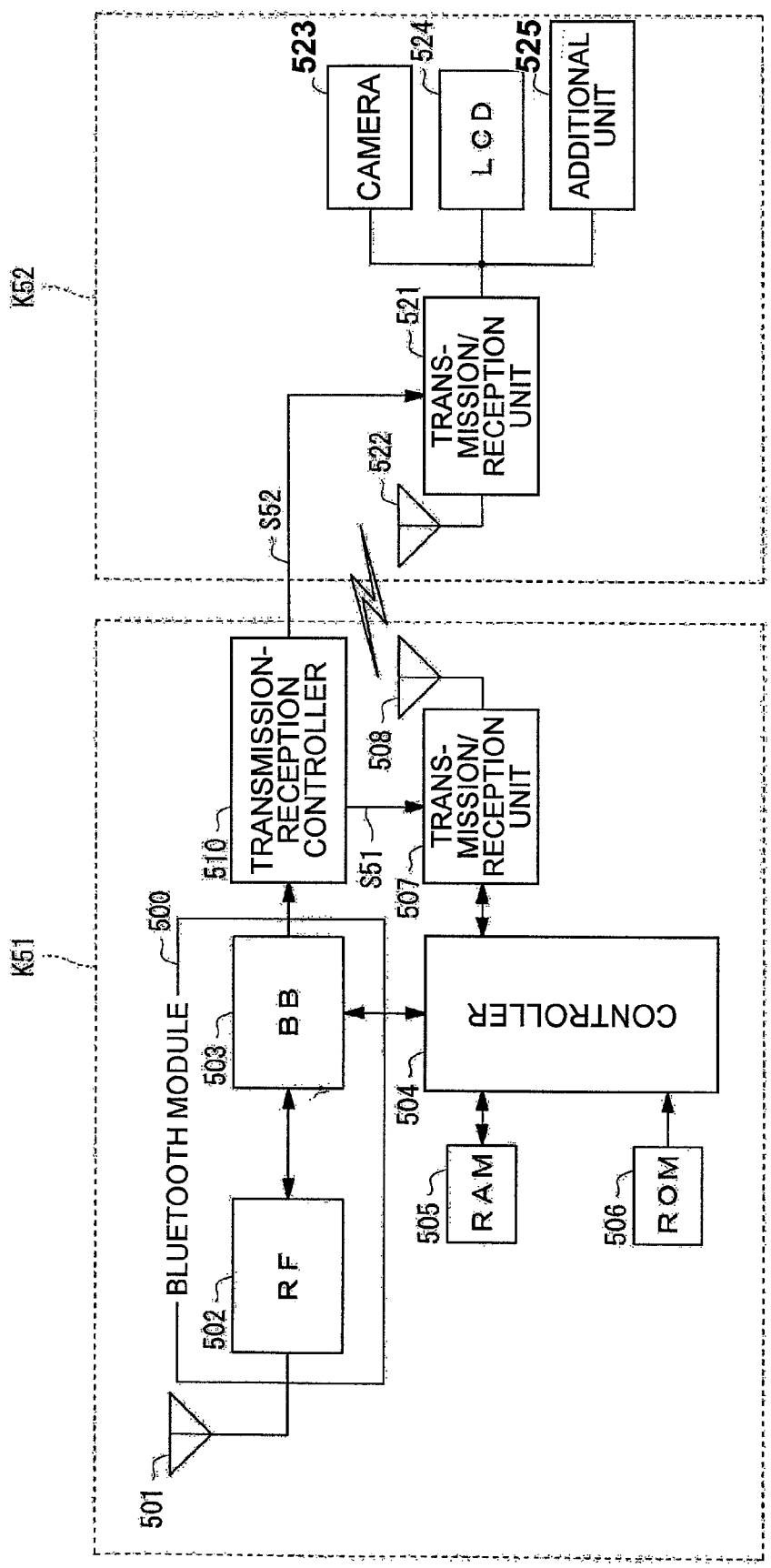
FIG. 11 is a block diagram showing the structure of a radio communication terminal according to a fifth embodiment of the invention.

FIG. 11 is a block diagram showing the structure of a radio communication terminal according to a fifth embodiment of the invention.

Referring to FIG. 11, a first casing K51 includes an external radio communication antenna 501, a Bluetooth module 500, a controller 504, a RAM 505, a ROM 506, a transmission/reception unit 507, an internal radio communication antenna 508, and a transmission-reception controller 510. A second casing K52 includes a transmission/reception unit 521, an internal radio communication antenna 522, a camera 523, a liquid-crystal display 524, and additional units 525. The Bluetooth module 500 includes a radio processing unit 502 and a baseband-signal processing unit 503. The baseband-signal processing unit 503 includes a Bluetooth link controller, and provides link control such as establishment of radio link connection, selection of frequency hopping sequence, and timing, output control, security processing, and packet processing. The first casing K51 and the second casing K52 are connected together so that their relative positional relationship can be varied.

Bluetooth allows organization of a network called Piconet by establishing a communication link among several radio communication terminals. Piconet can include one terminal called a master that takes on the communication control of all the radio communication terminals and multiple terminals called slaves that make communications according to instructions of the master. Piconet must have only one master, which is capable of communication while controlling one to seven slaves. The communication between the master and the slaves in Piconet is performed by a time division duplex (TDD) scheme.

Figure 12:
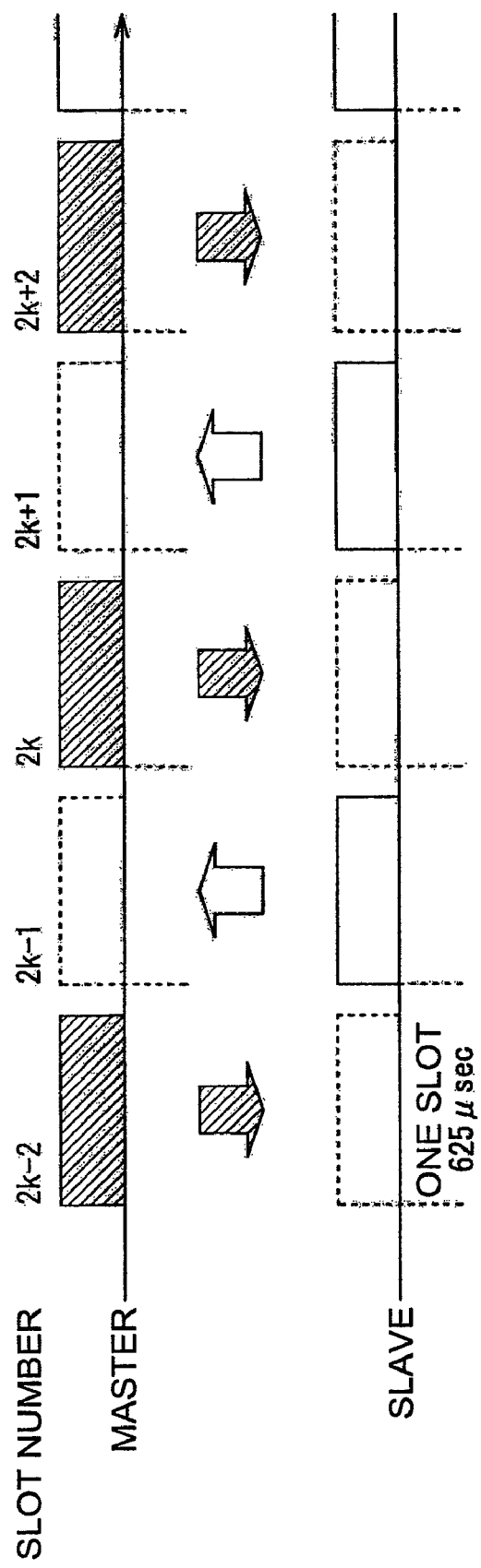
FIG. 12 is a diagram showing a method of communication between a master and a slave in a Piconet.

FIG. 12 is a diagram showing a method of communication between a master and slaves in a Piconet.

Referring to FIG. 12, by time division duplex, time is divided into consecutive slots of 625 μsec, and transmission and reception between the master and the slaves are switched with each slot. Specifically, for an even slot number, the direction of the packet sent between the master and the slaves present in one Piconet is from the master to the slaves, while for an odd slot number, the packet is transmitted from one slave to the master.

In Bluetooth, the transmission and reception of the packet are principally based on a polling system. Specifically, only the slaves that have received a packet from the master in even slots have the right to transmit the packet to the master in odd slots. For example, when a terminal is its own master, that terminal has a control right over itself, so that the master knows the slots it will use for transmission. On the other hand, where a terminal is a slave, the determination as to whether that terminal receives a packet during a reception slot can be made by inspecting the contents of the packet header.

Figure 13:
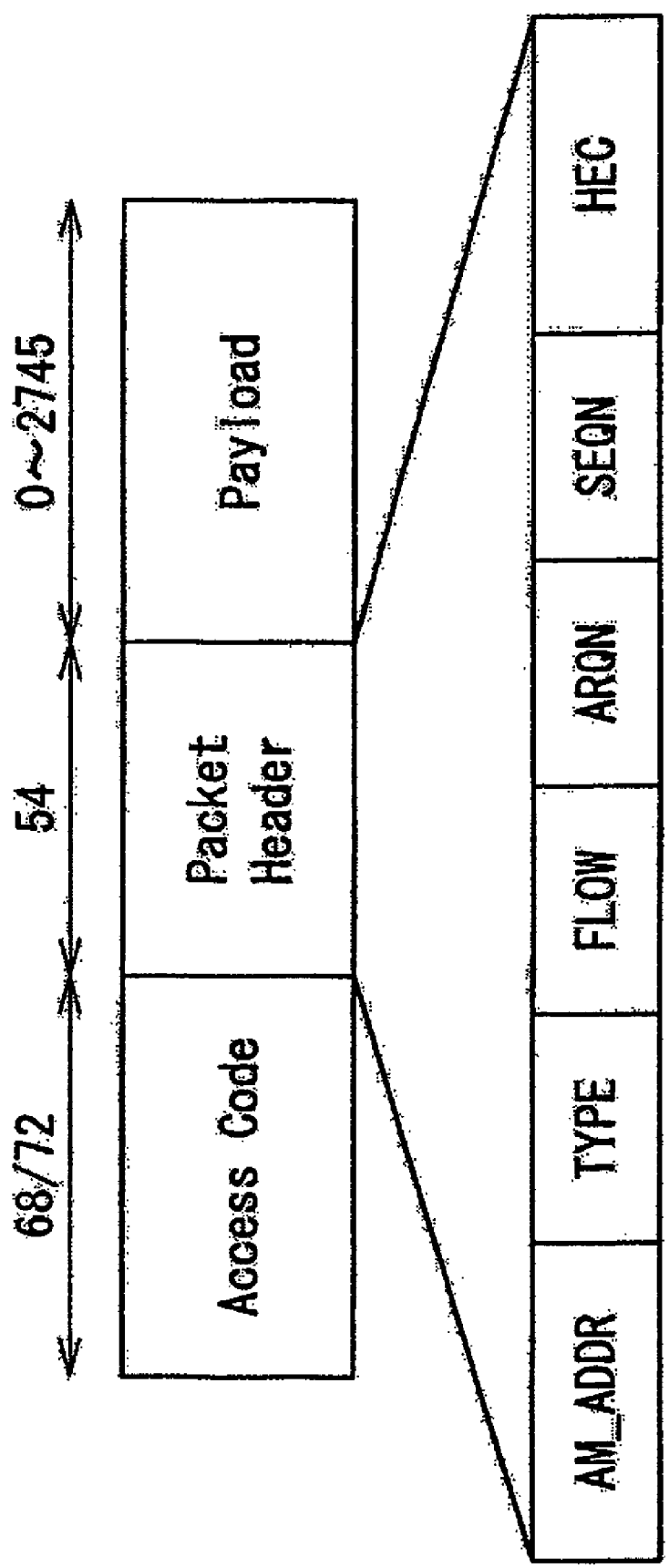
FIG. 13 is a diagram showing the packet structure of Bluetooth communication.

FIG. 13 is a diagram showing the packet structure of Bluetooth communication.

Referring to FIG. 13, the packet in Bluetooth communication is constructed of an access code, a packet header, and a payload. Here the packet header is composed of parameters for establishing a communication link in a baseband layer and includes an active member address (AM_ADDR) that specifies a communication slave in Piconet. When AM_ADDR is that of another terminal, transmission from the terminal is not made during the following transmission slot. On the other hand, when AM_ADDR is that of itself, transmission from the terminal is performed in the following transmission slot. The baseband-signal processing unit 503 can therefore detect the transmission timing of external radio communication by referring to the contents of the packet header contained in the received packet, and notify the transmission-reception controller 510 of the transmission timing. The transmission-reception controller 510 can thus stop the operation of the transmission/reception units 507 and 521 according to the transmission timing in the external radio communication.

FIG. 14 is a diagram showing a method of controlling the internal communication of the radio communication terminal of FIG. 11.

Figure 14A:
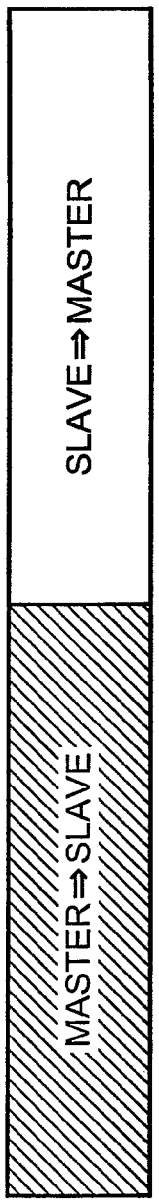
FIG. 14 is a diagram showing a method of controlling the internal communication of the radio communication terminal of FIG. 11.
Figure 14B:
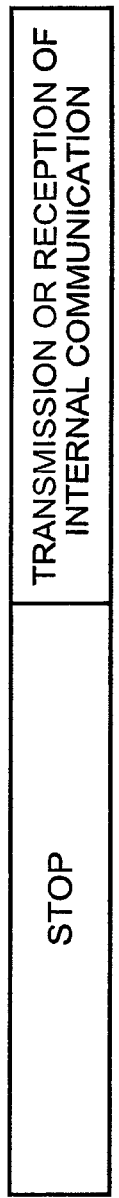

Referring to FIG. 14(b), in the case where a terminal is a master which transmits a packet to a slave, the transmission-reception controller 510 can generate transmission timing signals S51 and S52 and output them by wire to the transmission/reception unit 507 and 521, respectively. The transmission/reception units 507 and 521 can then stop the operation of the transmission/reception unit 507 and 521, respectively, when transmission/reception units 507 and 521 receive the transmission timing signals S51 and S52 respectively from the transmission-reception controller 510.

In the case where a terminal is a master and a packet is transmitted from a slave to the master, the transmission-reception controller 510 can stop the output of the transmission timing signals S51 and S52 and start operation of the transmission/reception units 507 and 521, thereby allowing internal radio communication.

Figure 14C:
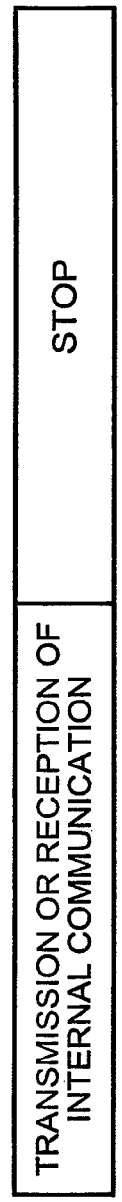

Referring to FIG. 14(c), in the case where a terminal is a slave which receives a packet addressed thereto, and when a packet is transmitted from the slave to the master, the transmission-reception controller 510 can generate the transmission timing signals S51 and S52 and output them by wire to the transmission/reception units 507 and 521, respectively. Then, the transmission/reception units 507 and 521 can stop the operation of the transmission/reception units 507 and 521, respectively when the transmission timing signals S51 and S52 are respectively received from the transmission-reception controller 510.

In the case where a terminal is a slave which receives a packet addressed thereto, and when a packet is transmitted from the master to the slave, the transmission-reception controller 510 can stop the output of the transmission timing signals S51 and S52 and start operation of the transmission/reception units 507 and 521, thereby allowing internal radio communication.

Figure 14D:

Referring to FIG. 14(d), in the case where a terminal is a slave and a packet is not addressed thereto, the transmission-reception controller 510 can stop the output of the transmission timing signals S51 and S52 and start operation of the transmission/reception units 507 and 521, thereby allowing internal radio communication.

Accordingly, even when communication between the master and a slave in Piconet is established, the timing of external radio communication can be determined by referring to the packet header that is received this time. This allows internal radio communication in the external radio communication idle time, preventing the degradation in the quality of internal radio communication while preventing the complication and an increase in the size of the circuit structure.

The embodiment of FIG. 11 shows a method in which the transmission-reception controller 510 outputs the transmission timing signals S51 and S52 to the transmission/reception units 507 and 521, respectively. However, instead of this the transmission-reception controller 510 may be configured to output the transmission timing signal S51 to the transmission/reception unit 507 and not output the transmission timing signal S52 to the transmission/reception unit 521.

The embodiment of FIG. 11 shows Bluetooth communication as an example of external radio communication. However, the external radio communication is not limited to Bluetooth communication, and any radio communication terminals may be utilized as long as they carry out internal radio communication between casings having an external radio communication function, such as W-LAN.

In the foregoing embodiments, a method of controlling the transmission in internal radio communication according to the transmission timing of external radio communication has been described by way of example. Alternatively, the transmission in internal radio communication may be controlled according to the reception timing of external radio communication. Also, the quality of internal radio communication may be monitored and a determination as to whether external radio communication is being performed may be made based on the monitored quality of the internal radio communication. Also, the fluctuation of the power supply line of the transmission power amplifier may be monitored to determine whether external radio communication is performed.

In the foregoing embodiments, a method in which the external radio communication antenna is provided on the first casing has been described. Alternatively, the external radio communication antenna may be disposed on the second casing.

In the foregoing embodiments, a radio communication terminal in which the positional relationship between the first casing and the second casing can be varied has been described by way of example. Alternatively, the invention may be applied to a radio communication terminal in which a pair of internal radio communication antennas is provided in the same casing.

What is claimed is:

1. A radio communication terminal comprising:
   a first casing;
   a second casing; and
   a connecting part that connects between the first casing and the second casing so that positions of the first casing and the second casing relative to each other are varied;
   wherein the second casing includes a display, a second internal radio communication antenna, and a second transmission/reception unit that transmits/receives data to/from the first casing via the second internal radio communication antenna;
   the first casing includes an external radio processing unit that transmits/receives data to/from outside, a first internal radio communication antenna, a first transmission/reception unit that transmits/receives data to/from the second casing via the first internal radio communication antenna, and an internal transmission-reception controller that is wire connected with at least one of the first transmission/reception unit and the second transmission/reception unit; and
   the internal transmission-reception controller controls a transmission timing of a radio wave sent from at least one of the first transmission/reception unit and the second transmission/reception unit according to an external communication timing at which the external radio processing unit transmits/receives data to/from outside.

2. A radio communication terminal comprising:
   a first casing;
   a second casing; and
   a connecting part that connects between the first casing and the second casing so that positions of the first casing and the second casing relative to each other are varied;
   wherein the second casing includes a display, a second internal radio communication antenna, and a second transmission/reception unit that transmits/receives data to/from the first casing via the second internal radio communication antenna;
   the first casing includes an external radio processing unit that transmits/receives data to/from outside, a first internal radio communication antenna, a first transmission/reception unit that transmits/receives data to/from the second casing via the first internal radio communication antenna, and an internal transmission-reception controller that is wire connected with at least one of the first transmission/reception unit and the second transmission/reception unit; and
   the internal transmission-reception controller stops operation of at least one of the first transmission/reception unit and the second transmission/reception unit at an external communication timing at which the external radio processing unit transmits data to outside.

3. A radio communication terminal comprising:
   a first casing;
   a second casing; and
   a connecting part that connects between the first casing and the second casing so that positions of the first casing and the second casing relative to each other are varied;
   wherein the second casing includes a display, a second internal radio communication antenna, and a second transmission/reception unit that transmits/receives data to/from the first casing via the second internal radio communication antenna;
   the first casing includes an external radio processing unit that transmits/receives data to/from outside, a first internal radio communication antenna, a first transmission/reception unit that transmits/receives data to/from the second casing via the first internal radio communication antenna, and an internal transmission-reception controller that is wire connected with at least one of the first transmission/reception unit and the second transmission/reception unit; and
   the internal transmission-reception controller stops operation of at least one of the first transmission/reception unit and the second transmission/reception unit based on a time schedule determined according to a transmission/reception timing of the external radio processing unit.

4. The radio communication terminal according to claim 3, wherein the internal transmission-reception controller stops the operation of at least one of the first transmission/reception unit and the second transmission/reception unit until a subsequent transmission slot when the terminal is a master and a packet is sent from the master to a slave, or when the terminal is a slave and receives a packet addressed to it, and a packet is sent from the slave to the master.

5. The radio communication terminal according to claim 1, wherein the radio communication terminal comprises a cellular telephone.

6. The radio communication terminal according to claim 1, wherein the internal radio communication comprises a short-range radio communication.

7. The radio communication terminal according to claim 1, further comprising an internal wire communication unit that transmits part of data to be displayed on the display from the first casing to the second casing by internal wire communication during at least one of transmission and reception of external radio communication.

8. The radio communication terminal according to claim 7, wherein the internal wire communication unit transmits part of data to be displayed on the display via a power supply line provided between the first casing and the second casing.

9. A method of controlling internal radio communication in which data transmission between casings having an external radio communication function is performed by internal radio communication, the method comprising:
   performing the internal radio communication between the casings; and
   selectively pausing the performing while the external radio transmission function is occurring.

10. A radio communication terminal comprising:
    a first casing;
    a second casing; and
    a connecting part that connects between the first casing and the second casing so that positions of the first casing and the second casing relative to each other are varied;
    wherein the second casing includes a display, a second internal radio communication antenna, and a second transmission/reception unit that transmits/receives data to/from the first casing via the second internal radio communication antenna;

the first casing includes an external radio processing unit that transmits/receives data to/from outside, a first internal radio communication antenna, a first transmission/reception unit that transmits/receives data to/from the second casing via the first internal radio communication antenna, and an internal transmission-reception controller that is wire connected with at least one of the first transmission/reception unit and the second transmission/reception unit; and the internal transmission-reception controller stops operation of at least one of the first transmission/reception unit and the second transmission/reception unit at an external communication timing at which the external radio processing unit receives data from outside.

* * * * *